(12) United States Patent
Varriale et al.

(10) Patent No.: US 9,332,009 B2
(45) Date of Patent: May 3, 2016

(54) USE, PROVISION, CUSTOMIZATION AND BILLING OF SERVICES FOR MOBILE USERS THROUGH DISTINCT ELECTRONIC APPARATUSES

(75) Inventors: Antonio Varriale, Turin (IT); Simonetta Mangiabene, Turin (IT); Elisa Alessio, Turin (IT); Maura Turolla, Turin (IT); Maurizio Marcelli, Rome (IT)

(73) Assignee: Telecom Italia S.p.A., Milan (IT)

( * ) Notice: Subject to any disclaimer, the term of this patent is extended or adjusted under 35 U.S.C. 154(b) by 1246 days.

(21) Appl. No.: 12/311,354

(22) PCT Filed: Sep. 29, 2006

(86) PCT No.: PCT/EP2006/009471
§ 371 (c)(1),
(2), (4) Date: Aug. 12, 2009

(87) PCT Pub. No.: WO2008/037286
PCT Pub. Date: Apr. 3, 2008

(65) Prior Publication Data
US 2010/0029200 A1    Feb. 4, 2010

(51) Int. Cl.
| | | |
|---|---|---|
| H04B 1/38 | (2015.01) |
| H04L 29/06 | (2006.01) |
| G06F 21/34 | (2013.01) |
| H04W 8/26 | (2009.01) |
| H04W 4/00 | (2009.01) |
| H04W 12/06 | (2009.01) |
| H04W 88/02 | (2009.01) |

(52) U.S. Cl.
CPC ........... *H04L 63/0853* (2013.01); *G06F 21/34* (2013.01); *H04W 8/26* (2013.01); *G06F 2221/2149* (2013.01); *H04W 4/00* (2013.01); *H04W 12/06* (2013.01); *H04W 88/02* (2013.01)

(58) Field of Classification Search
USPC ............... 455/418–421, 422.1, 551, 558, 559
See application file for complete search history.

(56) References Cited

U.S. PATENT DOCUMENTS 5,579,535 A * 11/1996 Orlen et al. ............... 455/421
2002/0186671 A1 * 12/2002 Nomura et al. ............ 370/328

(Continued)

FOREIGN PATENT DOCUMENTS

| EP | 1 607 906 A1 | 12/2005 |
| EP | 1 646214 A2 | 4/2006 |

(Continued)

*Primary Examiner* — Yuwen Pan
*Assistant Examiner* — Zhitong Chen
(74) *Attorney, Agent, or Firm* — Finnegan, Henderson, Farabow, Garrett & Dunner, L.L.P.

(57) ABSTRACT

An office electronic apparatus is associated to an apparatus card and is able to use or provide a service by means of identification information; the identification information allows billing of the use or provision of the service. A mobile telephone terminal is associated to a subscriber card storing subscriber identification information. According to the method of the present invention, at least the subscriber identification information and preferably also subscriber authentication information are transferred from the mobile telephone terminal to an office electronic apparatus when the said mobile telephone terminal is in proximity of the office electronic apparatus, the transferred information is stored into the apparatus card of the office electronic apparatus, and the service is autonomously used or provided by the office electronic apparatus by means of the transferred information.

13 Claims, 3 Drawing Sheets

(56) References Cited

U.S. PATENT DOCUMENTS

| | | | |
|---|---|---|---|
| 2003/0050898 A1* | 3/2003 | Oppat et al. | 705/64 |
| 2003/0055901 A1* | 3/2003 | Smith et al. | 709/206 |
| 2003/0073432 A1* | 4/2003 | Meade, II | 455/420 |
| 2003/0087601 A1* | 5/2003 | Agam et al. | 455/39 |
| 2003/0172028 A1* | 9/2003 | Abell et al. | 705/40 |
| 2004/0162022 A1* | 8/2004 | Lahetkangas et al. | 455/41.1 |
| 2004/0180657 A1 | 9/2004 | Yaqub et al. | |
| 2004/0203355 A1* | 10/2004 | Light | H04M 1/66 455/41.1 |
| 2004/0204087 A1* | 10/2004 | Carlsson | H04W 60/00 455/558 |
| 2004/0214524 A1* | 10/2004 | Noda et al. | 455/41.2 |
| 2005/0014493 A1* | 1/2005 | Ford | 455/418 |
| 2005/0048948 A1* | 3/2005 | Holland et al. | 455/404.1 |
| 2005/0048961 A1* | 3/2005 | Ribaudo et al. | 455/419 |
| 2005/0113137 A1* | 5/2005 | Rodriguez et al. | 455/558 |
| 2005/0182710 A1* | 8/2005 | Andersson et al. | 705/39 |
| 2006/0287004 A1* | 12/2006 | Fuqua | 455/558 |
| 2007/0004457 A1 | 1/2007 | Han | |
| 2008/0214241 A1* | 9/2008 | Hiltunen | H04W 8/205 455/558 |
| 2010/0273424 A1* | 10/2010 | De Petris et al. | 455/41.2 |

FOREIGN PATENT DOCUMENTS

| | | | |
|---|---|---|---|
| GB | 2 365 699 A | 2/2002 | |
| GB | 2375261 A * | 6/2002 | H04Q 7/32 |
| KR | 10-2006-0090049 | 8/2006 | |
| WO | WO 99/59360 A1 | 11/1999 | |
| WO | WO 01/31877 A2 | 5/2001 | |
| WO | WO 03/084265 A1 | 10/2003 | |
| WO | WO 2004/002176 A1 | 12/2003 | |
| WO | WO 2004/021296 A1 | 3/2004 | |
| WO | WO 2004021296 A1 * | 3/2004 | G06Q 20/00 |
| WO | WO 2005/104584 A1 | 11/2005 | |
| WO | WO 2006/056220 A1 | 6/2006 | |

* cited by examiner

USE, PROVISION, CUSTOMIZATION AND BILLING OF SERVICES FOR MOBILE USERS THROUGH DISTINCT ELECTRONIC APPARATUSES

CROSS REFERENCE TO RELATED APPLICATION

This application is a national phase application based on PCT/EP2006/009471, filed Sep. 29, 2006.

FIELD OF THE INVENTION

The present invention relates to the use, provision, customization and billing of services for mobile users through distinct electronic apparatuses.

BACKGROUND OF THE INVENTION

A mobile user, especially a business mobile user, has often the need to use various services, in particular communications services, through distinct office electronic apparatuses while he is on a travel or simply out of his office.

At present, he needs various different subscriptions (even with the same service provider) in order to be able to use and pay the same or similar services through distinct electronic apparatuses, such as personal computers, typically in different places, e.g. in different countries.

This is cumbersome both as it requires a number of subscriptions and as it requires a number of bills to be issued and paid.

From patent application EP1607906, there is known a couple of authentication cards. A first authentication card is inserted (installed) into a cellular phone and a second authentication card is inserted (installed) into a PDA. The first authentication card comprises an identification code transmission unit and the second authentication card comprises a usage restriction cancellation unit. The two units exchange the identification code by means of wireless signal and authenticate the identification code mutually. In case that the PDA is moved more than a predetermined distance from the cellular phone and the reception level of signal from the transmission unit received by the cancellation unit is smaller than a predetermined value (no reliable authentication may be carried out), or in case that the cancellation unit can not authenticate the identification code of the transmission unit, the cancellation unit stops transmission of the usage restriction cancellation signal to the PDA; as a result, the PDA is no longer in a usable state and the user is no longer able to use it.

From patent application WO0131877, there is known a method and arrangement wherein any private or secret information that is necessary for client authentication can be stored in a specific personal SIM card and used in combination with a mobile telephone as a security gateway to a protected intranet. An employee staying away from his ordinary office may, by means of a mobile phone functioning as a security gateway, communicate with the protected intranet of his employer; the employee can use any remote host in order to access the protected intranet but through a mobile phone provided with the specific personal SIM card. The solution is to move the security function to a mobile telephone where a lightweight security gateway or firewall is implemented. Alternatively, the employee may fit the specific personal SIM card directly into any remote host for communicating with the protected intranet.

From patent application WO9959360, there is known an arrangement for a wireless communication system; this arrangement comprises a wireless communication terminal and a subscriber identity unit which is adapted to comprise a subscriber identity module to which a subscriber identity is assigned; the subscriber identity unit is arranged to communicate the subscriber identity module related data such as the subscriber identity with the terminal over a local wireless communication link; this arrangement makes it possible to separate the subscriber identity unit from the terminal even while the terminal is communicating in the wireless system; the subscriber identity unit may get control of one or more wireless communication terminals and is used for giving authentication to the terminals.

SUMMARY OF THE INVENTION

The Applicant remarks that, in the solution according to EP1607906, the mutual authentication of the cellular phone and the PDA is used only for enabling the use of the PDA by the user.

In the solution according to WO0131877, it is necessary to use the specific personal SIM card, fit within a telephone or a computer, in order to be able to access an intranet by means of this computer.

In the solution according to WO9959360, the operation of the wireless communication terminal or terminals requires the presence and the active operation of the subscriber identity unit and the associated subscriber identity module during communication; in fact, none of the communication terminals are provided with an associated subscriber identity module. Therefore, this solution requires specific communication terminals in order to be implemented.

As already said, the Applicant has noticed that a mobile user has the need of using the same or similar services through distinct electronic apparatuses.

Additionally, the Applicant has noticed that a mobile user has also the need to have these services customized in the same or similar way. Billing of these services should be safe and reliable; this is especially important when the electronic apparatuses are used by different users and even more when they are in a public place, e.g. a hotel or an airplane.

Finally, there is a need for solutions that require the minimum change to existing systems and apparatuses.

It is the object of the present invention to meet at least part of these needs.

The Applicant has considered having a first smart card adapted to transfer subscriber identification information and possibly subscriber authentication information stored therein to other smart cards associated to electronic apparatuses so that they can use it for using or providing services autonomously with respect to the first smart card. In this way, thanks to a single smart card (i.e. a single subscription and a single billing and payment process) the same or similar services, in particular communications services, can be used or provided through distinct electronic apparatuses.

Typically this first smart card, called "Master card" or subscriber card, is fit within a mobile telephone terminal, e.g. a cellular phone.

Typically, the other smart card, called "Slave card" or apparatus card is fit within an electronic apparatus, e.g. a personal computer.

The present invention advantageously provides for the transfer, in particular from the Master card to the Slave card, not only of subscriber identification information but also of subscriber rights information and/or subscriber credit information and/or subscriber preferences information and/or applications and/or application commands.

Communication between the two smart cards can be direct, reliable and secure by means of a secure wireless technology such as ZigBee™. In this way security is improved because the source of transmission is secure, as it may be a secure module implemented through a smart card, the destination of transmission is secure, as it may be a secure module implemented through a smart card, and the communication (or transmission) channel is secure. The term smart cart identifies herein in general a card having processing functionalities and, preferably, tamper-resistant properties, e.g. a secure cryptoprocessor and a secure file system.

According to a first aspect, the present invention provides a method of using communication services comprising the steps of:

A) providing an electronic apparatus associated to an apparatus card and able to use a communication service by means of identification information, B) providing a mobile telephone terminal, C) associating a subscriber card storing subscriber identification information to the mobile telephone terminal, D) transferring at least the subscriber identification information from the subscriber card to the apparatus card when the mobile telephone terminal is in proximity of the electronic apparatus, E) storing the transferred information into the apparatus card, and F) using the communication service by means of the transferred information.

According to a second aspect, the present invention provides a method of providing services comprising the steps of:

A) providing an electronic apparatus associated to an apparatus card and able to provide a service by means of identification information, B) providing a mobile telephone terminal, C) associating a subscriber card storing subscriber identification information to the mobile telephone terminal, D) transferring at least the subscriber identification information from the subscriber card to the apparatus card when the mobile telephone terminal is in proximity of the electronic apparatus, E) storing the transferred information into the apparatus card, and F) providing the service by means of the transferred information. Said methods may further comprise the step of:

G) providing the electronic apparatus with a radio proximity detector associated to a radio coverage space and adapted to detect a mobile telephone terminal when inside the radio coverage space.

Step D above may provide for wireless transfer in a secure way.

The subscriber card and the apparatus card may comprise each a radio communication unit for communicating together.

The electronic apparatus may be a computer.

Said methods may further comprise the step of:

H) removing or disabling the transferred information when the mobile telephone terminal is out of proximity of the electronic apparatus.

Step H may be carried out when the mobile telephone terminal is outside a radio coverage space of a radio proximity detector of the electronic apparatus.

Step D may also provide for transferring subscriber authentication information and/or subscriber rights information and/or subscriber credit information and/or subscriber preferences information.

Said methods may further comprise the step of:

I) transferring applications from the mobile telephone terminal to the electronic apparatus, and may further comprise the step of:

L) storing the transferred applications into the electronic apparatus.

The transferred applications may be stored in the associated apparatus card or may be passed through the associated apparatus card.

Said methods may further comprise the step of:

M) transferring application commands from the mobile telephone terminal to the electronic apparatus;

and/or the steps of:

N) transferring applications from the electronic apparatus to the mobile telephone terminal, and O) storing the transferred applications into the mobile telephone terminal.

The transferred applications may be stored in the associated subscriber card or may be passed through the associated subscriber card.

According to a third aspect, the present invention provides a smart card for communications use adapted to be associated to a local electronic apparatus, storing subscriber identification information and comprising a configuration block adapted to transmit the stored subscriber identification information to a smart card associated to a remote electronic apparatus, the transmitted information being adapted and sufficient to be used by the remote electronic apparatus for providing a service autonomously with respect to the smart card of the local electronic apparatus.

The configuration block may also be adapted to transmit subscriber authentication information and/or subscriber rights information and/or subscriber credit information and/or subscriber preferences information to the smart card of the remote electronic apparatus.

The smart card may comprise a programming block adapted to transmit applications to the smart card of the remote electronic apparatus.

The smart card may comprise a controlling block adapted to transmit application commands to the smart card of the remote electronic apparatus.

The smart card may comprise a radio communication unit for communicating with a remote electronic apparatus and/or a radio proximity detector associated to a radio coverage space and adapted to detect a remote electronic apparatus when inside the radio coverage space.

The smart card comprises at least operator network authentication functionalities of a telephone subscriber module.

According to a fourth aspect, the present invention provides a smart card for communications use adapted to be associated to a local electronic apparatus in order to provide a service, comprising a configuration block adapted to receive and store subscriber identification information from a smart card associated to a remote electronic apparatus, and being adapted to use the received information for providing the service autonomously with respect to the smart card associated to the remote electronic apparatus.

The configuration block may also be adapted to receive subscriber authentication information and/or subscriber rights information and/or subscriber credit information and/or subscriber preferences information from the smart card of the remote electronic apparatus.

The smart card may comprise a programming block adapted to receive applications from the smart card of the remote electronic apparatus.

The smart card may comprise a controlling block adapted to receive application commands from the smart card of the remote electronic apparatus.

The smart card may be adapted to transfer the received applications and/or the received commands to the associated local electronic apparatus.

The smart card may comprise a radio communication unit for communicating with a remote electronic apparatus and/or a radio proximity detector associated to a radio coverage space and adapted to detect a remote electronic apparatus when inside the radio coverage space.

The smart card may comprise operator network authentication functionalities of a telephone subscriber module.

According to a fifth aspect, the present invention provides a SDIO card or USB dongle comprising a smart card according to the invention.

The smart card may have at least two operation modes, in a first operation mode using subscriber identification information pre-stored locally and in a second operation mode using subscriber identification information received remotely.

BRIEF DESCRIPTION OF THE DRAWINGS

The present invention will become more apparent from the following description to be considered in conjunction with the annexed drawings, wherein.

It is to be understood that the following description and the annexed drawings are not to be interpreted as limitations of the present invention but simply as exemplifications.

DETAILED DESCRIPTION OF THE INVENTION

Figure 1:
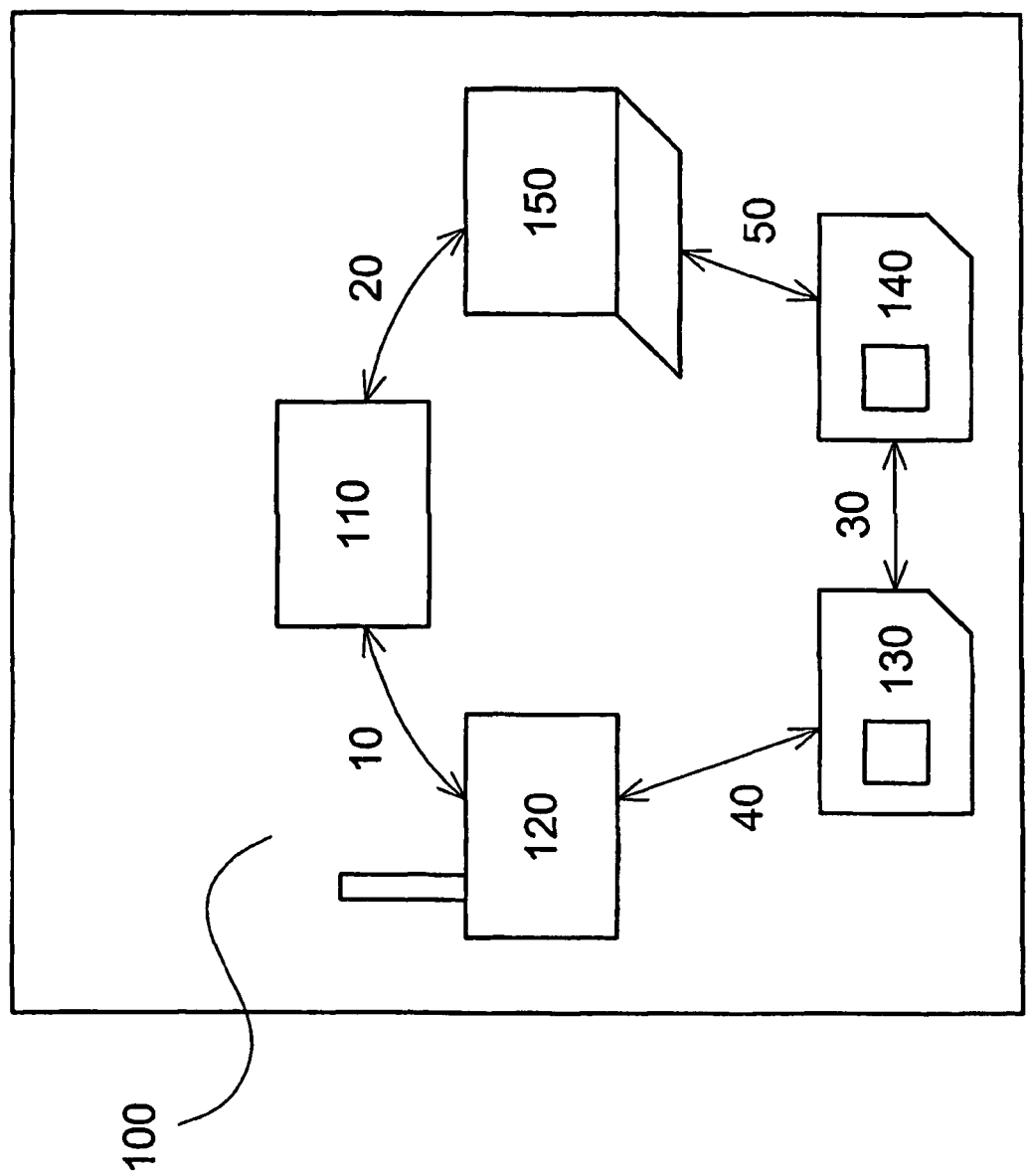
FIG. 1 shows schematically a system according to the present invention.

In FIG. 1, the whole system is indicated with reference 100. System 100 comprises:
- a telecommunication network 110, for example a 2G/3G network, such as GSM and/or UMTS;
- a mobile telephone terminal 120, for example a 2G technology mobile phone for exchanging phone calls;
- a first smartcard 130, specifically a "Master" card, having an integrated radio communication unit;
- an electronic apparatus 150, e.g., an office electronic apparatus, for example a laptop PC having a device for exchanging e-mails (as well as for browsing through the Internet) by means of a 3G technology connection; and
- a second smartcard 140, specifically a "Slave" card, having a integrated radio communication unit.

In order to simplify the description of the present invention, the scenario shown in FIG. 1 is reduced to its minimum, i.e. one mobile telephone terminal and one office electronic apparatus. Anyway, in general, there may be many electronic apparatuses; in fact, as already explained before, a mobile user has the need of using the same or similar services (in the example of FIG. 1 for example e-mail exchange and/or Internet connection) through distinct office electronic apparatuses. In a general case, there may be a plurality of office electronic apparatuses and a plurality of mobile telephone terminals.

Smartcards 130 and 140 may have the architecture and the internal operation disclosed e.g. in patent applications WO2005104584 and WO2006056220 of the same Applicant.

In the embodiment of FIG. 1, smartcard 130 has all the functionalities of a SIM [Subscriber Identification Module] card and additional functionalities that will be described in the following; while smartcard 140 has all the functionalities of a USIM [Universal SIM] card and additional functionalities that will be described in the following. SIM or USIM functionalities preferably comprise operator network authentication functionalities.

The radio communication units of smartcards 130 and 140 are of the (relatively) short range type; in other words, are adapted for the so-called WPAN [Wireless Personal Area Network] applications; for example they use the ZigBee™ standard technology. This technology is particularly suitable for the present invention due to the kind of information transmitted and received by the smartcards, i.e., secret, as for example in particular the KI key and/or the IMSI code, because it implements a secure communication channel. Alternatively, these radio communication units may use, for example, the Bluetooth™ standard technology. These technologies provide for radio proximity detectors associated to a radio coverage space that can be programmable.

It is to be noted that security may be intrinsic to the communication protocol between the smart cards or may be implemented, e.g., at application level.

Smartcard 130, like any SIM card, securely stores subscriber identification information and subscriber authentication information.

For GSM, the identification information comprises an IMSI [International Mobile Subscriber Identity] code and the authentication information comprises a KI [Individual Subscriber Authentication Key] key; it is to be noted that while the IMSI code is not secret (even if it is recommended to limit its circulation over communication networks), the KI key is secret and is known only to the SIM card (that, according to the prior art, keeps it internally protected) and to the service provider (that issued this SIM card).

Subscriber identification information are used for identifying the subscriber that is interested in using the service and that has to be billed.

Smartcard 140, like any SIM or USIM, enables both the use of a communication service from the telecommunication network and the provision of a corresponding communication service to a user based on an IMSI code and a KI key.

According to the present invention, "Master" and "Slave" capabilities are defined:
Master: smartcard associated to the subscriber, to be inserted into the mobile telephone terminal; and
Slave: smartcard associated to the service providing apparatus, to be inserted into the office electronic apparatus, configurable and programmable by a Master card.

In the embodiment of FIG. 1, such configuring and programming is carried out through a proximity radio communication channel 30 implemented thanks to the radio communication units of the two smartcards.

In the embodiment of FIG. 1, the Slave card 140 can be configured by the Master card 130 in terms of subscriber identification, subscriber authentication, subscriber rights, subscriber credit and subscriber preferences. The Slave card 140 can be programmed by the Master card 130 in terms of applications to be run typically in the associated office electronic apparatus. The Master card 140 can also query the Slave card 130 about the functionalities that the apparatus associated thereto is able to export; in this case, for example, the mobile telephone terminal 120, through the Master card 130, could be able to remotely control and/or execute, through the Slave card 140, applications resident in the office electronic apparatus 150.

The system 100 of FIG. 1 includes two kinds of radio communication channels. The first one is a proximity radio channel 30, which is the radio channel among the cards 130 and 140. The second one is a wide range radio channel; for clarity purposes, the channel between the network 110 and the mobile telephone terminal 120 is indicated with reference 10, while the channel between the network 110 and the office electronic apparatus 150 is indicated with reference 20. It is to be noted that while the channel between the network and the mobile telephone terminal has to be wide range radio type, the communication channel associated to the office electronic apparatus may be of the wired type (based e.g. on electric cable or optical fibre) or wireless (i.e. radio) type or mixed type and may be for connection to the same or a different network with respect to the telecommunication network associated to the mobile telephone terminal.

Master card 130 and Slave card 140 are respectively connected to mobile telephone terminal 120 and office electronic apparatus 150 through a communication interface, for example both through the known ISO7816 standard interface. For clarity purposes, the two communication interfaces are indicated with two different references, respectively 40 and 50; in fact, in general, they may be different and/or according to proprietary specifications; this applies especially for interface 50 between Slave card 140 and apparatus 150.

According to the above description, system 100 provides for two smartcards 130 and 140 each implementing a secure module, specifically a Subscriber Identification Module.

Alternatively, one or both of them can be realized through a SDIO [Secure Digital Input/Output] card or a USB [Universal Serial Bus] dongle and a corresponding interface in the apparatus; this solution is particularly applicable to the office electronic apparatus. According to a preferred implementation of this alternative, the SDIO card/USB dongle has an integrated proximity radio communication unit preferably with the features described above, i.e. using ZigBee™ or Bluetooth™ technology.

Anyway, it is indeed possible that the secure module and/or the associated proximity radio communication unit is integrated in the apparatus; this solution is particularly applicable to the office electronic apparatus. Even in this case, the two preferred communications technologies are ZigBee™ or Bluetooth™.

Whatever the implementation of the secure module(s), the corresponding hardware architecture and software architecture are basically the same.

The components of system 100 appropriately interact between each other and in this way a user can use services provided by the office electronic apparatus 150 thanks to the subscriber identification information and possibly the subscriber authentication information stored in the Master card 130 and transferred to the office electronic apparatus 150, particularly to the Slave card 140; on the other hand, the office electronic apparatus 150 provides to the user services according to its own capabilities and thanks to the subscriber identification information and possibly the subscriber authentication information stored in the Master card 130 and received therefrom. In the case of a communication service, the office electronic apparatus 150 uses a communication service provided by a service provider by means of the transferred subscriber identification and authentication information and, in turn, provides a communication service to the user. For these purposes, the office electronic apparatus 150 may need not only subscriber identification information, but also subscriber rights information and/or subscriber credit information; such additional information is typically stored in a subscriber card, like e.g. a SIM card, and in the embodiment of FIG. 1 it is stored in the Master card 130 and transferred to the Slave card 140 through the proximity radio communication channel 30.

The office electronic apparatus 150 may be able to customize the services provided to the user; for this purpose, it needs subscriber preferences information; subscriber preferences information is typically stored in a subscriber card, like e.g. a SIM card, and in the embodiment of FIG. 1 it is stored in the Master card 130 and transferred to the Slave card 140 through the proximity radio communication channel 30.

It is to be understood that the transfer of the subscriber information takes place when the mobile telephone terminal is in proximity of the office electronic apparatus, more specifically when it enters its radio coverage space. The transferred subscriber information is stored into the office electronic apparatus, particularly into the associated Slave card 140, in order to be used thereafter one or more times by the office electronic apparatus for using and/or providing services independently from the Master card 130. Such storage may be temporary or permanent; in the temporary case, storage may start when the mobile telephone terminal comes in proximity of the office electronic apparatus, more specifically when it enters its coverage space, and may end when the mobile telephone terminal gets out of proximity of the office electronic apparatus, more specifically when it exits its coverage space; the end of storage may correspond either to the removal (i.e. deletion or erasure) of the transferred information from storage means or to its disabling (e.g. marking the stored information as not accessible or not usable).

It is to be noted that in the embodiment of FIG. 1 the transfer of information takes place directly between the two smartcards; anyway, in alternative embodiments the transfer of information between the two smartcards may take place through the mobile telephone terminal and the office electronic apparatus, e.g., through a direct communication between the mobile telephone terminal and the office electronic apparatus.

An example will be provided in the following in order to explain the configuration procedure in conjunction with a communication service.

Let us consider, for example, a laptop PC shared among many users, with UMTS/HDSPA [Universal Mobile Telecommunications System/High-Speed Downlink Packet Access] integrated modem. In this case Internet connection is the service provided by the office electronic apparatus to the user and the UMTS/HDSPA network connection is the communication service used by the office electronic apparatus for providing the internet connection service to the user. In order to be identified and authenticated by the Network, a subscriber card needs to be associated with the laptop PC.

According to the prior art, in order to manage a single subscription (for both the operator and user convenience), a user has to extract his subscriber card, for example a SIM or USIM card, from his mobile phone and to insert it into the laptop PC; this operation is cumbersome; additionally, in this way, he can no longer use his mobile phone.

The present invention allows to project temporarily the subscriber information, in particular subscriber Identity information and possibly subscriber authentication information, of the Master card 130, which remains inside the mobile phone, on the Slave card 140, fit inside the laptop PC, so that the laptop PC is able to access the Network, without removing any card; this projection is carried out through the proximity radio communication channel 30. Typically, such projection starts when the mobile phone 120 and the associated Master card 130 enters into the radio coverage space of the Slave card 140, continues during the coverage time, and ends when the mobile phone 120 and the associated Master card 130 exits the radio coverage space of the Slave card 140.

The identification/authentication procedure with the Network could be implemented e.g. in two phases. In a first phase the identification information permanently stored in the Slave card 140 is used for identifying and authenticating just the laptop PC as a "trusted office apparatus", i.e. "trusted" by the Network and/or its Operator. In a second phase, the Master card 130 projects at least its subscriber identification and authentication information (but possibly also subscriber credit and/or right and/or preferences information) on the Slave card 140 and the office electronic apparatus uses it for identifying and authenticating the subscriber; thereafter the Operator can start the billing procedure. It is apparent that, in this way, billing is unified even if different charges may be applied when the same subscriber uses a mobile telephone terminal or an office electronic apparatus.

As the communication between the two secure modules is through a secure channel (implemented through ZigBee™ wireless technology), security both for the subscriber identification information and for the subscriber authentication information is fully guaranteed. In particular the security of the channel is guaranteed by encryption of the data packets on the radio link at physical level. Such encryption may be obtained e.g. by means of symmetrical keys previously distributed to the secure modules, or by means of session keys dynamically generated from digital certificates.

As no card is extracted from any apparatus, in principle both apparatuses could be used at the same time; this makes sense as a user may have the need e.g. to make or receive a phone call while he is browsing the internet or checking his e-mails. Anyway, this is a matter of service policy on one side and technical constraints on the other side; in fact, in the example of FIG. 1, the Network should be able to deal at the same time with two distinct apparatuses associated to the same subscriber. A simpler solution would be that a Master card that has projected its subscriber identification information on a Slave card is no longer able to use its subscriber identification information till when projection is terminated.

Another example will be provided in the following in order to explain the configuration procedure in conjunction with another kind of service, namely a security service provided by the office electronic apparatus to the user for personal data and/or application stored in a storage device, for example a hard-disk, of the office electronic apparatus.

In this case, the Slave card inside the laptop PC may be configured by the Master card inside the mobile phone in order to allow a user to read and/or write personal data and/or to execute personal applications; this may include encryption/decryption.

The Master card temporarily projects subscriber information, in particular subscriber identity information such as a subscriber access password and/or an encryption/decryption key, on the Slave card and the laptop PC associated to the Slave card uses this information for accessing personal data and applications e.g. by dynamically locking/unlocking the whole file system or singles files, and/or for encrypting/decrypting personal data and applications. Also in this case and in order to increase security transfer of subscriber authentication information may be provided.

According to an additional feature, the access to the protected personal data and/or applications stored in the laptop PC can not only be carried out by means of the subscriber information stored in the Master card associated to the mobile phone, but also be remotely performed by the user through the mobile phone by means of the (e.g. secure) communication channel between the Master card and the Slave card.

In the described examples, the Slave card is a temporary projection of the Master card; in other words, the Master card configures the Slave card. Such projection/configuration may apply to all the functions carried out by the Slave card or only to some of them: in the latter case, the Slave card carries out some functions Irrespective of the proximity to a Master card. It may be appropriate to provide that a Master card does not project all configuration information (subscriber identification, authentication, credit, rights and preferences information) but only those which are likely to be useful or necessary for an office electronic apparatus associated to a Slave card.

The present invention advantageously provides that the Master card not only configures but also programs the Slave card; this is used to add (i.e. store) further applications (and therefore functionalities) either to the Slave card or to the office electronic apparatus associated thereto.

For example, let us consider system 100 where the Slave card 140 is already able to enable some services to the user, without the Master card 130 proximity. For the business Laptop PC 150 located in a common area like the meeting room of a Company, the Slave card 140 contains information related to all the Company employees, like e-mail addresses, internal phone numbers, etc.; in this way, any employee can send e-mails and make internal phone calls through laptop PC 150.

Each Company manager has his own Master card storing manager related applications. When one these Master cards is in proximity of the Slave card, it temporarily adds new functionalities to the office electronic apparatus through the Slave card by uploading new applications, specifically the manager related applications. For example, after such programming, the office electronic apparatus through the Slave card becomes able to decode secret messages or e-mails addressed to the associated manager. This new service was not available before the Master card programming procedure, and will be unavailable as well when the Master card is out of proximity range.

The present invention advantageously provides that the coupling of Master card and Slave card allows the mobile telephone terminal to remotely control and/or use the functionalities of the office electronic apparatus.

Let us consider an application which allows projecting e.g. presentations during e.g. a business meeting. In this case, the Slave card could export to the mobile telephone terminal, through the Master card, the remote control of the presentation. The user will be able to send from the mobile telephone terminal to the office electronic apparatus commands such as "NextPicture", "PreviousPicture" and "GoToPicture". Additionally, the mobile telephone terminal could be used for displaying the man-machine interface of the application.

From the hardware architectural point of view, Master card 130 and Slave card 140 can be similar and the different functionalities may be associated to different firmware only; anyway, this is not always the case for all embodiments of the present invention.

It may be provided that the same card may act as a Master in certain situations and as a Slave in other situations; this is a reason more for having the same hardware architecture or even exactly the same hardware.

Figure 2:
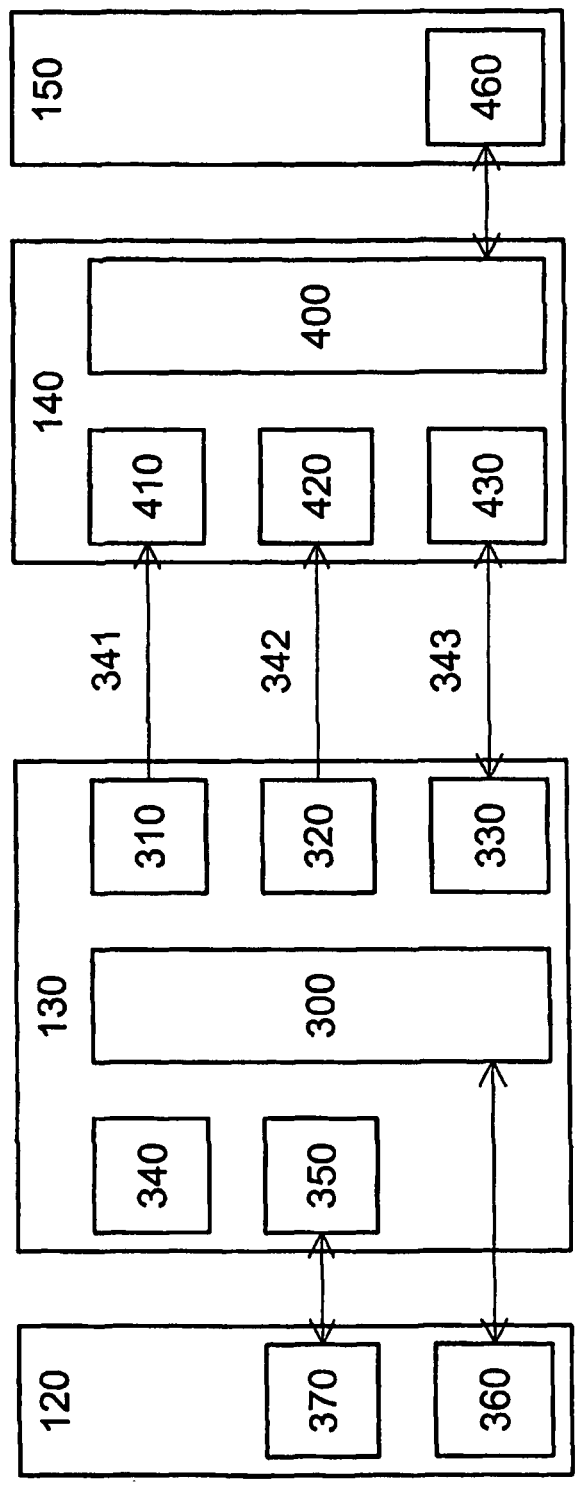
FIG. 2 shows a schematic block diagram of part of the system of FIG. 1.

As shown in the embodiment of FIG. 2, the Master card 130 is able to configure (arrow 341), program (arrow 342) and send commands (arrow 343) to the Slave card 140. The Master card middleware stack is made up of an Application Manager 300 which manages local (to the card) applications 340 and external (to the card) applications 360 and 370 that are typically on the mobile telephone terminal 120; applications 360 interact directly with the Application Manager 300 while applications 370 interact indirectly with the Application Manager 300 through an Internal (to the card) application layer 350.

Application requests in the mobile telephone terminal 120 can be translated in different processes which are managed by three specific blocks 310, 320, 330 in the Master card 130. The first block is the Configuration Sender Block 310, which is adapted to transfer subscriber information (e.g. identification and/or rights and/or credit and/or preferences) from the Master card to the Slave card. The second block is a Program Sender Block 320, which is adapted to transfer applications from the Master card to the Slave card. The third block is a Command Sender Block 330, which is adapted to send commands, typically applications commands, from to the Master card to the Slave card; the third block may be also adapted to receive replies to these commands and this is why arrow 343 is bidirectional.

Arrows 341, 342, 343 represent data flows between the mobile telephone 120 and the office electronic apparatus 150, more particularly between the Master card 130 and the Slave card 140. These data flows are implemented through the proximity radio communication channel 30 advantageously based on ZigBee™ technology.

In the office electronics apparatus 150, specifically in the associated Slave card 140, there are three blocks corresponding to the above mentioned blocks in the Master card 130, namely a Configuration Receiver Block 410, a Program Receiver Block 420 and a Command Receiver Block 430. In the Slave card 140 there is also an Application Manager 400 which manages applications; in office electronic apparatus 150 associated to card 140, one or more applications 460 is/are adapted to interact with the Application Manager 400.

Various applications 460 in the office electronic apparatus 150 may take advantage of the various transferred subscriber information, for example a login manager may use e.g. the transferred subscriber identity information, an Internet browser may use e.g. the transferred subscriber credit and/or rights information, the operating system may use e.g. the transferred subscriber preferences information (language of the subscriber, screen and video settings, etc.).

Applications 460 in the office electronic apparatus 150 may be added and/or upgraded through the programming procedure that is implemented in the embodiment of FIG. 2 essentially through blocks 320 and 420. This may apply also to applications stored in the Slave card 140.

The programming procedure may imply a permanent or temporary transfer/storage of an application. The first case is useful e.g. for upgrading applications (in the Slave card and/or in the office electronic apparatus) and the second case is useful for temporary increasing number and/or functionalities of the applications to be run in the office electronic apparatus in relation to the proximity of a Master card. It is to be noted that the information necessary for the upgrading may be received by the Master card from the outside, for example the Telecommunication Network 110.

The commanding procedure may be used, in principle, by any application, either in the Master card 130 (i.e. applications 340) or in the mobile telephone terminal 120 (i.e. applications 360 and 370). This functionality is useful when an application in the mobile telephone terminal 120, in particular in the associated Master card 130, has the need to communicate/interact with an application in the office electronic apparatus 150, in particular in the associated Slave card 140; this is typically the case of remote control of an application.

As already said, the communication channel between block 330 and block 430 is bidirectional because each command may be followed by a reply, e.g. confirmation that the command has been received or executed correctly.

Specific commands may be provided which allow downloading new applications (e.g. applications 340 and/or 350 and/or 360 and/or 370) from the Slave card 140 to the Master card 130; in this case, the data flow from the Slave card 140 to the Master card 130 does not consist of simple replies. In general, applications may be transferred (and thereafter stored) from the office electronic apparatus, and/or from the associated Slave card, to the telephone terminal and/or to the associated Master card, passing through one or more smartcards.

The communications between the Master card 130 and the Slave card 140, i.e. communication channel 30, may be of the encrypted type. In case the ZigBee™ technology is used, the encryption is at physical level; in general, there is always the possibility of implementing a secure channel between the two cards at application level using known technologies.

It is worth noting that the term "Master" does not necessarily refer to the entity which starts communication with the "Slave"; the Slave card may start with a message requesting information to the Master card and the Master card may reply by transferring the requested information. For example, a login manager running in office electronic apparatus associated to a Slave card may issue a request of username/password couple; if the Slave card has already received these credentials from a Master card, the login manger will use them for login, otherwise the login manager will send a request message to any mobile telephone terminal (associated to a Master card) located in its proximity by means of the Slave card and will wait for a reply.

An implementation of the dialog between Master card 130 and Slave card 140 in case of remote control of an application can be, e.g., the following:

1) Master card 130 sends a "join" command to Slave card 140 using block 330 in order to build up the communication channel;
2) Slave card 140 sends a "joint successful" reply to acknowledge receipt of the command using block 430;
3) Master card 130 sends a "Remote Control Application Request" command to check for a specific application on Slave card 140 using block 330;
4) Slave card 140 sends an "Application Available" reply to acknowledge receipt of the command using block 430;
5) Master card 130 sends remote commands to Slave card 140 (specifically to the application to be controlled) using block 330;
6) Slave card 140 sends acknowledgment replies for each executed command using block 430;
7) at the end of the application, Master card 130 sends a "detach" command to Slave card 140 using block 330 in order to release the application; and
8) Slave card 140 sends a "detach successful" reply to acknowledge receipt of the command using block 430.

Figure 3:
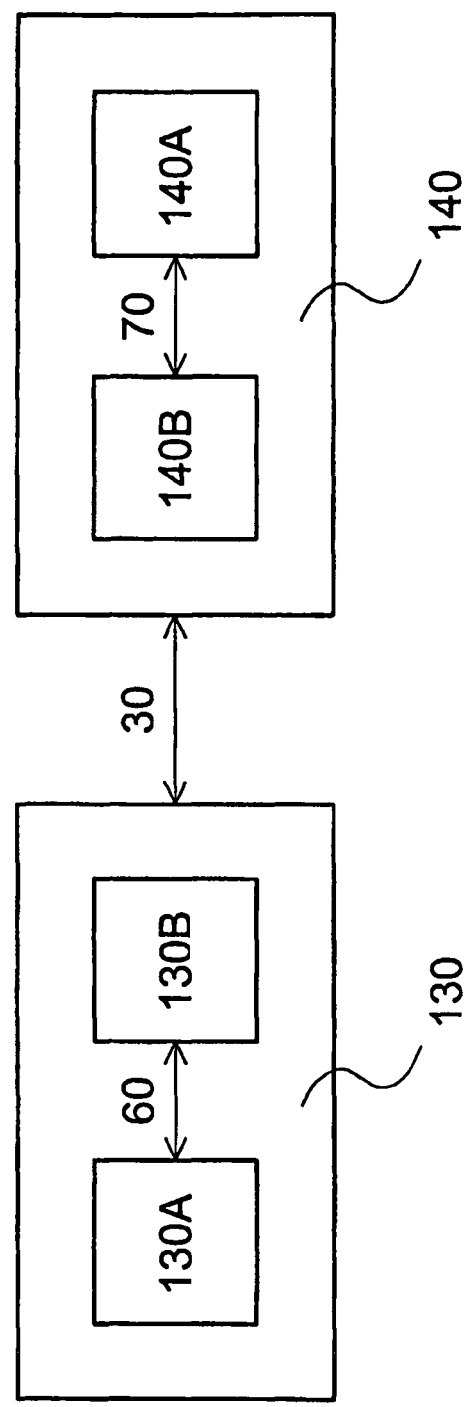
FIG. 3 shows a possible split of the software in smart cards according to the present invention.

As shown in FIG. 3, from the software point of view, the Master card 130 and the Slave card 140 can be split in two parts. The first one is the proximity radio software layer 130B and 140B and the second one is the application software layer 130A and 140A. The two layers are connected by an internal communication channel 60 and 70, which can be physical or logical according to the implementation of the cards. Advantageously, the present invention allows separating the application layer from the radio layer, so that the software development can be independent.

The separation can be obtained by defining a common interface between the application layer and the radio layer as follows:

"Activate": activate the radio layer communication

"Send": send a command/reply to another card, through the proximity radio channel "Receive": receive a reply/command from another card, through the proximity channel "Control": send a control/configuration command to the radio layer "Deactivate": deactivate the radio layer The above functions allow building the firmware architecture described before and transport specific commands.

From the radio layer point of view, there are two kinds of commands coming from the application layer: "to be passed" (PAS) and "to be parsed" (PAR).

Referring to FIG. 3, the PAS commands are straightly transmitted to another card by the radio layer 130B without being parsed; the PAR commands are parsed and executed at the radio layer 130B.

PAR and PAS concepts can also be applied to functions, i.e. a group of commands. Only the following combinations are permitted:

PAS Function transporting PAR Commands;
PAS Function transporting PAS Commands;
PAR Function transporting PAR Commands;
PAR functions are not allowed to transport PAS commands.

The "Activate" is a PAR function and transports a PAR command for the radio layer 130B. The command is actually parsed and executed at the radio layer 130B, which gets ready to perform the radio operations.

The "Send" is a PAS function. It is able to transport both PAR and PAS commands. In the first case (PAR), the transported command is sent from the application layer 130A to the radio layer 1408. Then the command is parsed and executed at the radio layer. This is useful for remote configuration of the radio layer, for example to set the radio power of the Slave card 140 from the application layer of the Master card 130. In the second case (PAS), the transported command is sent from the application layer 130A to the application layer 140A. The command is parsed and executed from the application layer, for example to show the next picture of the laptop presentation.

The "Receive" is a PAS function and transports a PAS command. This is a callback function generated, for example, at the application layer of the Slave card 140 after a Master card "Send" function with PAS command.

It is to be remarked that "Send" and "Receive" functions can be activated with distance limitation. For example, the ZigBee™ standard allows defining the range of the proximity transmission so that it is possible to create/enable proximity services according to the distance between the Master card and the Slave card. This capability is useful for scenarios like login, mobile payments, etc.

The "Control" is a PAR function and transports PAR commands. This is used from the application layer 130A to set or get radio parameters related to the radio layer 130B.

The "Deactivate" is a PAR function and transports a PAR command for the radio layer 130B. The command is actually parsed and executed at the radio layer 130B, which gets switched off.

"Activate" and "Deactivate" functions are useful in order to minimize power consumption. In case of ZigBee™ technology, for example, these functions are used in synchronized way so that the Slave card is able to receive commands from the Master card just when commands are sent. The Master card and the Slave card activate the radio part just in particular time slot, as configured at the beginning when the communication channel is initialized.

The above functions above can be used to implement all the scenarios previously described. In the remote control of applications, for example, the following operations could be implemented:

"Activate": perform the join operation,
"Control": check for remote control application availability,
"Send": send remote commands (e.g. "NextPicture", "PreviousPicture", "GoToPicture", etc.),
"Deactivate": detach the remote control application.

It is to be noted that, in order to simplify the description of the common interface, the above functions have been described considering the Master card, i.e. the smartcard associated to the mobile telephone terminal and to the subscriber, as the communication starter; but this should not be interpreted as a limitation of the present invention.

Although the present invention is centred on a method teaching, one important aspect regards smartcards, specifically a Master card or subscriber card and a Slave card or apparatus card. In the following their main technical features will be described.

In general, according to the present invention, the Master card (e.g. 130) is a smart card for communications use adapted to be associated to a local electronic apparatus (e.g. 120), in particular a mobile telephone terminal; it stores at least subscriber identification information and comprises a configuration block (e.g. 310) adapted to transmit the stored subscriber identification information to a remote electronic apparatus (e.g. 150), in particular to a smart card (e.g. 140) associated to the remote electronic apparatus; the transmitted information is adapted and sufficient to be used by the remote electronic apparatus for autonomously providing a service.

As already mentioned, in some applications, in order to use a service, it is necessary not only to identify the subscriber but also to authenticate him; therefore, it may be necessary to transfer also subscriber authentication information. This is the case of communication applications such as e.g. GSM telephone service. The configuration block (e.g. 310) may be adapted to transmit not only subscriber identification information but also subscriber rights information and/or subscriber credit information and/or subscriber preferences information to the remote electronic apparatus, in particular to the smart card associated to the remote electronic apparatus.

The Master card (e.g. 130) may comprises also a programming block (e.g. 320) adapted to transmit applications to the remote electronic apparatus, in particular to the smart card associated to the remote electronic apparatus.

The Master card (e.g. 130) may comprise also a controlling block (e.g. 330) adapted to transmit application commands to the remote electronic apparatus, in particular to the smart card associated to the remote electronic apparatus.

The Master card (e.g. 130) may comprise also a radio communication unit for communicating with remote electronic apparatuses, in particular with the smart cards associated to remote electronic apparatuses, in particular through ZigBee™ technology.

The Master card (e.g. 130) may comprise also a radio proximity detector associated to a radio coverage space and adapted to detect a remote electronic apparatus, in particular a smart card associated to a remote electronic apparatus, when inside this radio coverage space.

The Master card according to the present invention may comprise other features; for example and typically, like card 130, it comprises at least the essential features of a telephone SIM or USIM.

In general, according to the present invention, the Slave card (e.g. 140) is a smart card for communications use adapted to be associated to a local electronic apparatus (e.g. 150), in particular an office electronic apparatus, in order to provide a service; it comprises a configuration block (e.g. 410) adapted to receive and store a subscriber identification information from the remote electronic apparatus (e.g. 120), in particular from the smart card (e.g. 130) associated to the remote electronic apparatus, and is adapted to use the received information for autonomously providing said service.

As already mentioned, in some applications, in order to use a service, it is necessary not only to identify the subscriber but also to authenticate him; therefore, it may be necessary to receive also subscriber authentication information. This is the case of communication applications such as e.g. GSM telephone service.

The configuration block (e.g. 410) may be adapted to receive also subscriber rights information and/or subscriber credit information and/or subscriber preferences information from the remote electronic apparatus, in particular from the smart card associated to the remote electronic apparatus.

The Slave card (e.g. 140) may comprise also a programming block (e.g. 420) adapted to receive applications from the remote electronic apparatus, in particular from the smart card associated to the remote electronic apparatus.

The Slave card (e.g. 140) may comprise also a controlling block (e.g. 430) adapted to receive application commands from the remote electronic apparatus, in particular from the smart card associated to the remote electronic apparatus.

The Slave card (e.g. 140) may be further adapted to transfer to the received applications and/or said received commands to the associated local electronic apparatus (e.g. 150). The Slave card (e.g. 140) may comprise also a radio communication unit for communicating with remote electronic apparatuses, in particular with a smart cards associated to remote electronic apparatuses, in particular through ZigBee™ technology.

The Slave card (e.g. 140) may comprise a radio proximity detector associated to a radio coverage space and adapted to detect a remote electronic apparatus, in particular a smart card associated to said remote electronic apparatus, when inside this radio coverage space.

The Slave card according to the present invention may comprise other features; for example, like card 140, it comprises at least the essential features of a telephone SIM or USIM, such as operator network authentication functionalities.

It is to be understood that, once the subscriber identity information and possibly the subscriber authentication information is transferred from the Master card to the Slave card, the Slave card has the minimum information necessary for allowing the associated electronic apparatus to autonomously provide the desired service, e.g. allowing GSM phone calls in the ordinary way, without the further help of the Master card.

As already said, a smart card according to the present invention may act as and therefore have the features of both a Master card and a Slave card.

In this case, the smart card may have at least two operation modes; in the first one it uses the subscriber information pre-stored locally and in the second one it uses subscriber information received remotely; this applies in particular to the subscriber identification information and possibly to the subscriber authentication information.

The invention claimed is:

1. A method of providing access to an office electronic apparatus providing communication services comprising:
    providing the office electronic apparatus associated with an apparatus card configured to use a communication service;
    authenticating the office electronic apparatus to a provider of the communication services using apparatus identification information pre-stored on said apparatus card;
    receiving at said apparatus card subscriber information pre-stored on a subscriber card associated with-mobile telephone terminal when said mobile telephone terminal is in proximity of said office electronic apparatus, said received subscriber information including at least subscriber identification information and subscriber authentication information;
    configuring said apparatus card by storing said received subscriber information in said apparatus card, wherein said received subscriber information stored in said apparatus card is deleted from said apparatus card when said mobile telephone terminal is out of proximity of said office electronic apparatus;
    authenticating the subscriber to the provider of the communication services using the received subscriber information stored in said apparatus card independently from the subscriber card and said mobile telephone;
    autonomously providing said communication services to the authenticated subscriber on the authenticated office electronic apparatus while the mobile telephone terminal using the subscriber information pre-stored in the subscriber card is separately and simultaneously connected to the provider of said communication services through a wide range radio channel; and
    providing billing information relating to said received information stored in said apparatus card to said provider of said communication services.

2. The method according to claim 1, further comprising the step of:
    providing said office electronic apparatus with a radio proximity detector associated with a radio coverage space and configured to detect the mobile telephone terminal when inside said radio coverage space.

3. The method according to claim 1, wherein said subscriber card and said apparatus card each comprise a radio communication unit for communicating together.

4. The method according to claim 3, further comprising:
    disabling said received information stored in said apparatus card when said mobile telephone terminal is out of proximity of said electronic apparatus.

5. The method according to claim 1, further comprising:
    receiving applications from said mobile telephone terminal on said office electronic apparatus.

6. The method according to claim 5, further comprising:
    storing said received applications in said office electronic apparatus.

7. The method according to claim 1, further comprising:
    receiving application commands from said mobile telephone terminal at said office electronic apparatus.

8. The method according to claim 1, further comprising:
    transferring applications from said office electronic apparatus to said mobile telephone terminal.

9. A smart card for communications configured to be associated with a local office electronic apparatus in order to provide communication services, comprising a configuration block configured to receive and store subscriber identification information and subscriber authentication information pre-stored on a smart card associated with a remote electronic apparatus, configured to delete said subscriber identification and authentication information based on a proximity of said remote electronic apparatus, and configured to use said received and stored information for providing said service autonomously to said local office electronic apparatus while said remote electronic apparatus is separately and simultaneously connected to the provider of said communication services through a wide range radio channel, wherein said smart card is further configured to authenticate said smart card associated with the local office electronic apparatus using said received and stored subscriber identification and authentication information independently from said smart card associated with a remote electronic apparatus, to authenticate the local office electronic apparatus to a provider of the communications services using apparatus identification information pre-stored on said smart card associated with the local office electronic apparatus, and to provide billing information relating to said subscriber identification information to said provider.

10. The smart card according to claim 9, wherein said configuration block is configured to receive at least one of subscriber rights information, subscriber credit information, and subscriber preferences information from said smart card of said remote electronic apparatus.

11. The smart card according to claim 9, comprising a programming block configured to receive applications from said smart card of said remote electronic apparatus.

12. The smart card according to claim 9, comprising a controlling block configured to receive application commands from said smart card of said remote electronic apparatus.

13. The smart card according to claim 11, configured to transfer said received applications and received commands to said associated local office electronic apparatus.

\* \* \* \* \*